(12) United States Patent
Hammad et al.

(10) Patent No.: US 10,483,567 B2
(45) Date of Patent: Nov. 19, 2019

(54) MECHANICAL ENERGY STORAGE IN FLOW BATTERIES TO ENHANCE ENERGY STORAGE

(71) Applicant: Saudi Arabian Oil Company, Dhahran (SA)

(72) Inventors: Ahmad D. Hammad, Dhahran (SA); Stamatios Souentie, Dhahran (SA); Issam T. Amr, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 269 days.

(21) Appl. No.: 15/397,991

(22) Filed: Jan. 4, 2017

(65) Prior Publication Data

US 2018/0191008 A1     Jul. 5, 2018

(51) Int. Cl.

| H01M 8/04276 | (2016.01) |
|---|---|
| H01M 8/20 | (2006.01) |
| H01M 8/18 | (2006.01) |
| H01M 8/02 | (2016.01) |

(52) U.S. Cl.
CPC ........ *H01M 8/04276* (2013.01); *H01M 8/02* (2013.01); *H01M 8/18* (2013.01); *H01M 8/188* (2013.01); *H01M 8/20* (2013.01); *Y02E 60/528* (2013.01)

(58) Field of Classification Search
CPC .... H01M 8/04276; H01M 8/18; H01M 8/188; H01M 8/20; H01M 8/02; Y02E 60/528
See application file for complete search history.

(56) References Cited

U.S. PATENT DOCUMENTS

| 2013/0011702 A1 | 1/2013 | Horne et al. |
| 2014/0060666 A1 | 3/2014 | Evans et al. |
| 2015/0111117 A1 | 4/2015 | Lipka et al. |

FOREIGN PATENT DOCUMENTS

| WO | 2011114199 A1 | 9/2011 |
| WO | 2015027113 A1 | 2/2015 |

OTHER PUBLICATIONS

International Search Report for Application No. PCT/US2018/012165 dated May 30, 2018.
Chen et al., "A Low-Dissipation, Pumpless, Gravity-Induced Flow Battery", Energy & Environmental Science, 2016, The Royal Society of Chemistry.

*Primary Examiner* — Eugenia Wang
(74) *Attorney, Agent, or Firm* — Dinsmore & Shohl LLP

(57) ABSTRACT

A hybrid flow redox battery system includes an electrochemical cell with an ion-exchange membrane, an anode, and a cathode, an anolyte tank, a catholyte tank, one or more tank separators, a plurality of electrolyte pathways, one or more turbines, and one or more power generation circuits. The anolyte tank includes a lower anolyte opening positioned below an upper anolyte opening. The catholyte tank includes a lower catholyte opening positioned below an upper catholyte opening. The electrolyte pathways extend between the upper and lower anolyte openings and the anode and the upper and lower catholyte openings and the cathode. The turbines are fluidly coupled to the electrolyte pathways. The tank separators are positioned within one or both of the anolyte tank and the catholyte tank and are translatable in a downward direction to induce electrolyte flow from the lower anolyte and catholyte openings, through the turbines to hydroelectrically generate power.

20 Claims, 7 Drawing Sheets

MECHANICAL ENERGY STORAGE IN FLOW BATTERIES TO ENHANCE ENERGY STORAGE

BACKGROUND

The present disclosure relates to hybrid flow redox battery systems. More specifically, the present disclosure introduces technology for hybrid flow redox battery systems that include tank separators and turbines.

BRIEF SUMMARY

According to the subject matter of the present disclosure, a hybrid flow redox battery system includes an electrochemical cell, an anolyte tank, a catholyte tank, one or more tank separators, a plurality of electrolyte pathways, one or more turbines, and one or more power generation circuits. The electrochemical cell includes an ion-exchange membrane positioned between and electrochemically engaged with an anode and a cathode. At least one of the one or more power generation circuits is electrically coupled to the anode and the cathode. The anolyte tank includes an upper anolyte opening and a lower anolyte opening positioned below the upper anolyte opening. The catholyte tank includes an upper catholyte opening and a lower catholyte opening positioned below the upper catholyte opening. One or more of the plurality of electrolyte pathways extend between the upper anolyte opening and the anode and extend between the lower anolyte opening and the anode to fluidly couple the anolyte tank to the anode. One or more of the plurality of electrolyte pathways extend between the upper catholyte opening and the cathode and extend between the lower catholyte opening and the cathode to fluidly couple the catholyte tank to the cathode. The one or more turbines are fluidly coupled to one or more of the plurality of electrolyte pathways. The one or more tank separators are positioned within one or both of the anolyte tank and the catholyte tank. Further, the one or more tank separators are translatable in a downward direction to induce electrolyte flow from one or both of the lower anolyte opening and the lower catholyte opening through the one or more turbines to hydroelectrically generate power.

In accordance with one embodiment of the present disclosure, a hybrid flow redox battery system includes an electrochemical cell, an anolyte tank, a catholyte tank, one or more tank separators, a plurality of electrolyte pathways, one or more turbines, one or more pumps, and one or more power generation circuits. The electrochemical cell includes an ion-exchange membrane positioned between and electrochemically engaged with an anode and a cathode. At least one of the one or more power generation circuits is electrically coupled to the anode and the cathode. The anolyte tank includes an upper anolyte opening and a lower anolyte opening positioned below the upper anolyte opening. The catholyte tank includes an upper catholyte opening and a lower catholyte opening positioned below the upper catholyte opening. One or more of the plurality of electrolyte pathways extend between the upper anolyte opening and the anode and extend between the lower anolyte opening and the anode to fluidly couple the anolyte tank to the anode. One or more of the plurality of electrolyte pathways extend between the upper catholyte opening and the cathode and extend between the lower catholyte opening and the cathode to fluidly couple the catholyte tank to the cathode. The one or more pumps are fluidly coupled to one or more of the plurality of electrolyte pathways. The one or more turbines are fluidly coupled to one or more of the plurality of electrolyte pathways. The one or more tank separators are positioned within one or both of the anolyte tank and the catholyte tank. The one or more tank separators are translatable in a downward direction to induce electrolyte flow from one or both of the lower anolyte opening and the lower catholyte opening through the one or more turbines, rotating the one or more turbines to hydroelectrically generate power. Further, the power generated hydroelectrically by electrolyte flow through the one or more turbines when the one or more tank separators translate from a raised position to a lowered position in the downward direction is greater than or equal to 50% of the power consumed by the one or more pumps to translate the one or more tank separators in an upward direction from the lowered position to the raised position.

In accordance with another embodiment of the present disclosure, a hybrid flow redox battery system includes an electrochemical cell, an anolyte tank, a catholyte tank, one or more tank separators, a plurality of electrolyte pathways, one or more turbines, one or more valves, and one or more power generation circuits. The electrochemical cell includes an ion-exchange membrane positioned between and electrochemically engaged with an anode and a cathode. At least one of the one or more power generation circuits is electrically coupled to the anode and the cathode. The anolyte tank includes an upper anolyte opening and a lower anolyte opening positioned below the upper anolyte opening. The catholyte tank includes an upper catholyte opening and a lower catholyte opening positioned below the upper catholyte opening. One or more of the plurality of electrolyte pathways extend between the upper anolyte opening and the anode and extend between the lower anolyte opening and the anode to fluidly couple the anolyte tank to the anode. One or more of the plurality of electrolyte pathways extend between the upper catholyte opening and the cathode and extend between the lower catholyte opening and the cathode to fluidly couple the catholyte tank to the cathode. The one or more valves are fluidly coupled to one or more of the plurality of electrolyte pathways. The one or more turbines are fluidly coupled to one or more of the plurality of electrolyte pathways. The one or more tank separators are positioned within one or both of the anolyte tank and the catholyte tank. The one or more tank separators are translatable in a downward direction to induce electrolyte flow from one or both of the lower anolyte opening and the lower catholyte opening through the one or more turbines to hydroelectrically generate power. When electrolyte flows from the electrochemical cell to at least one of the lower anolyte opening and the lower catholyte opening the one or more valves prevent electrolyte passage through at least one of the one or more turbines. Further, when electrolyte flows from at least one of the lower anolyte opening and the lower catholyte opening to the electrochemical cell, the one or more valves allow electrolyte passage through at least one of the one or more turbines.

Although the concepts of the present disclosure are described in this disclosure with primary reference to some specific hybrid flow redox battery system configurations, it is contemplated that the concepts will enjoy applicability to hybrid flow redox battery systems having any configuration.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
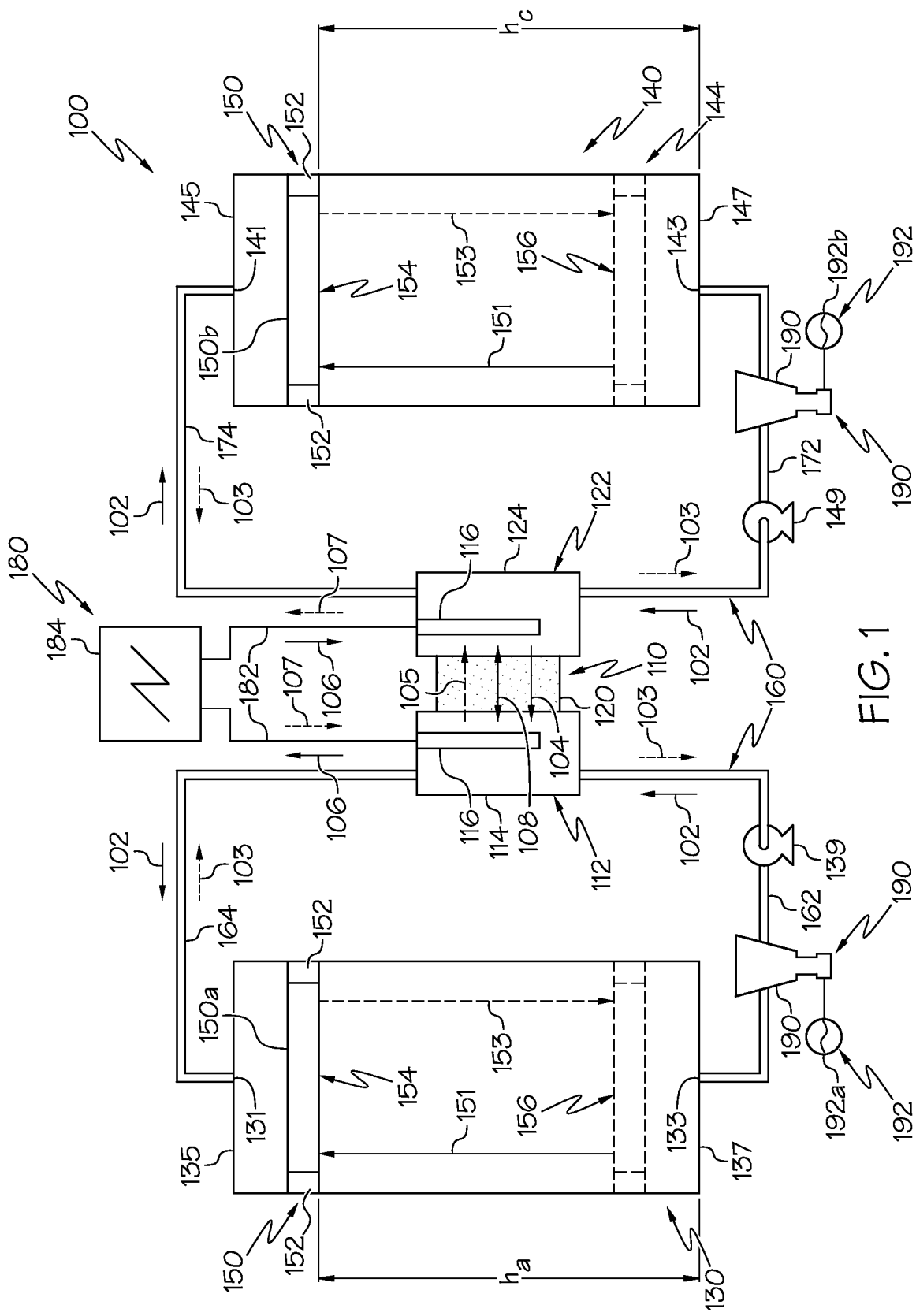
FIG. 1 is a schematic illustration of a hybrid flow redox battery system having one or more tank separators and one or more turbines according to one or more embodiments shown and described herein.

FIGS. 1-5 are schematic illustrations of a hybrid flow reduction/oxidation (redox) battery system 100. The hybrid flow redox battery system 100 comprises an electrochemical cell 110, an anolyte tank 130, a catholyte tank 140, a power generation circuit 180, and one or more turbines 190. The electrochemical cell 110 is electrically coupled to the power generation circuit 180 and is fluidly coupled to the anolyte tank 130 and the catholyte tank 140 using a plurality of electrolyte pathways 160. The hybrid flow redox battery system 100 includes electrolyte solutions such as an anolyte solution and a catholyte solution. The anolyte solution may be housed within the anolyte tank 130 and may flow between the anolyte tank 130 and the electrochemical cell 110. The catholyte solution may be housed within the catholyte tank 140 and may flow between the catholyte tank 140 and the electrochemical cell 110. In operation, when the anolyte solution and the catholyte solution are present in the electrochemical cell 110, the electrochemical cell 110 in combination with the power generation circuit 180 may electrochemically generate power. Further, the one or more turbines 190 are fluidly coupled to the plurality of electrolyte pathways 160 such that electrolyte solutions flowing between the anolyte tank 130 or the catholyte tank 140 and the electrochemical cell 110 may flow through the one or more turbines 190, actuating the one or more turbines 190 to hydroelectrically generate power.

The anolyte solution may comprise a plurality of charged anolyte active materials, a plurality of discharged anolyte active materials, or combinations thereof and is compositionally configured to oxidize at the electrochemical cell 110 during an electrochemical discharging operation of the hybrid flow redox battery system 100 and reduce at the electrochemical cell 110 during an electrochemical charging operation of the hybrid flow redox battery system 100. As used is this application, "active material" refers to a chemical component such as an atom, ion, molecule, or the like, that is compositionally configured to change oxidation states when undergoing a redox reaction. For example, it is contemplated that the active materials of the anolyte solution may comprise vanadium, chromium, zinc, sulfur, neptunium, uranium, or a combination thereof. Moreover, each of the plurality of charged anolyte active materials comprise a lesser positive charge and a lesser oxidation state than each of the plurality of discharged anolyte active materials.

The catholyte solution may comprise a plurality of charged catholyte active materials, a plurality of discharged catholyte active materials, or combinations thereof and is compositionally configured to reduce at the electrochemical cell 110 during the electrochemical discharging operation and oxidize at the electrochemical cell 110 during the electrochemical charging operation. Each of the plurality of charged catholyte active materials comprise a greater positive charge and a greater oxidation state than each of the plurality of discharged catholyte active materials. For example, it is contemplated that the active materials of the catholyte solution may comprise vanadium, bromine, cerium, chlorine, ferricyanide, ferrocyanide, manganese, neptunium oxide, uranium oxide, or a combination thereof.

Further, the anolyte solution and catholyte solution may each comprise any active material having redox pairs which exhibit different standard reduction potentials. Further, the anolyte solution may comprise an active material with a lesser standard reduction than the active material of the catholyte solution. The table subsequent depicts a non-exhaustive list of active material redox pairs that may be used as the catholyte solution and the anolyte solution.

| Catholyte Solution Active Materials | Anolyte Solution Active Materials |
|---|---|
| $Cr^{3+}/Cr^{2+}$ | $Fe^{3+}/F^{2+}$ |
| $V^{3+}/V^{2+}$ | $V^{5+}/V^{4+}$ |
| $V^{3+}/V^{2+}$ | $Br_2/Br-$ |
| $V^{3+}/V^{2+}$ | $Fe^{3+}/F^{2+}$ |
| $V^{3+}/V^{2+}$ | $Ce^{4+}/Ce^{3+}$ |
| $Zn^{2+}/Zn$ | $Cl-/Cl_2$ |
| $Zn^{2+}/Zn$ | $Br-/Br_2$ |
| $Zn^{2+}/Zn$ | $Ce^{4+}/Ce^{3+}$ |
| $Zn^{2+}/Zn$ | $V^{5+}/V^{4+}$ |
| $Zn^{2+}/Zn$ | $[Fe(CN)_6]^{4-}/[Fe(CN)_6]^{3-}$ |
| $V^{3+}/V^{2+}$ | $Ce^{4+}/Ce^{3+}$ |
| $V^{3+}/V^{2+}$ | $Mn^{3+}/Mn^{2+}$ |
| $S_2^{2-}/S_4^{2-}$ | $Br^-/Br_3^-$ |
| $Np^{4+}/Np^{3+}$ | $NpO_2^+/NpO_2^{2+}$ |
| $U^{4+}/U^{3+}$ | $UO_2^+/UO_2^{2+}$ |

As depicted in FIGS. 1-5, the electrochemical cell 110 comprises an ion-exchange membrane 120 positioned between and electrochemically engaged with an anode 112 and a cathode 122. The anode 112 includes an anode conductive portion 116 electrically coupled to the power generation circuit 180 such that electrons may flow between the anode 112 and the power generation circuit 180. The anode 112 also includes an anolyte receiving portion 114 fluidly coupled to the anolyte tank 130 such that the anolyte solution may flow between the anolyte tank 130 and the anolyte receiving portion 114 of the anode 112 along one or more of the electrolyte pathways 160. When the anolyte solution is located within the anolyte receiving portion 114, the anolyte solution may electrochemically contact the ion-exchange membrane 120 and the anode conductive portion 116.

The cathode 122 includes a cathode conductive portion 126 electrically coupled to the power generation circuit 180 such that electrons may flow between the cathode 122 and the power generation circuit 180. The cathode 122 also includes a catholyte receiving portion 124 fluidly coupled to the catholyte tank 140 such that the catholyte solution may flow between the catholyte tank 140 and the catholyte receiving portion 124 of the cathode 122 along one or more of the electrolyte pathways 160. When the catholyte solution is located within the catholyte receiving portion 124, the catholyte solution may electrochemically contact the ion-exchange membrane 120 and the cathode conductive portion 126.

The ion-exchange membrane 120 may comprise a solid state proton conducting material, for example, Nafion®, Nafion® 117, Flemion®, Fumapem®, Aciplex®, Dow® materials, Selemion®, TPS®, Gore® L01854, Gore® M04494, ABT3, ABT4, SZ, Hipore®, SPEEK, Nafion®/SPEEK, PSSS, SPTK, Radel®, PVDF-PSSA, ETFE-PD-MAEMA, SPEEK/TPA, TPA/PP, SPEEK/PTFE, SPEEK/PFSA, PBI, PSf-ABIm, polybenzimidazole, polyether polymer, or the like. The ion-exchange membrane 120 is positioned within the electrochemical cell 110 and may provide a physical barrier between the anolyte receiving portion 114 of the anode 112 and the catholyte receiving portion 124 of the cathode 122. Further, the ion-exchange membrane 120 is structurally configured to provide a proton pathway 108 between the anode 112 and the cathode 122 such that protons may flow therebetween to facilitate oxidation and reduction reactions within the anode 112 and the cathode 122 during the electrochemical discharging operation and the electrochemical charging operation of the hybrid flow redox battery system 100.

Further, the proton pathway 108 of the ion-exchange membrane 120 may close a circuit between the anode 112, the power generation circuit 180, and the cathode 122 such that oxidation and reduction reactions may generate electron flow between the anode 112 and the cathode 122 and through the power generation circuit 180, and may generate proton flow between the anode 112 and the cathode 122 and through the ion-exchange membrane 120. For example, during the electrochemical discharging operation, protons may traverse the proton pathway 108 provided by the ion-exchange membrane 120 in a proton discharging flow direction 104 from the cathode 122 to the anode 112 and during the electrochemical charging operation, protons may traverse the proton pathway 108 of the ion-exchange membrane 120 in a proton charging flow direction 105 from the anode 112 to the cathode 122.

Referring still to FIGS. 1-5, the power generation circuit 180 comprises a power generation unit 184. The circuit pathway 182 is electrically coupled to the anode 112, the power generation unit 184 and the cathode 122. For example, the circuit pathway 182 may extend between and electrically couple the anode 112 and the power generation unit 184 and the circuit pathway 182 may extend between and electrically couple the cathode 122 and the power generation unit 184. The power generation unit 184 may comprise a power source and an electrical load. Further, the power generation unit 184 is structurally configured to receive current generated by electrons output by the anode 112 and, upon receiving current, generate power. The power generation unit 184 is also structurally configured to output current receivable by the anode 112 to charge the anolyte solution and the catholyte solution.

In operation, the hybrid flow redox battery system 100 may perform an electrochemical charging operation or an electrochemical discharging operation. During the electrochemical discharging operation of the hybrid flow redox battery system 100, the anode 112 may receive a charged anolyte active material from the anolyte solution. The anode 112 may also receive a proton output by the cathode 122 from the proton pathway 108 formed by the ion-exchange membrane 120 to oxidize the charged anolyte active material. When oxidized, the charged anolyte active material outputs an electron receivable by the anode conductive portion 116 such that the electrons flow in an electron discharging direction 106 along the circuit pathway 182 to the power generation circuit 180. Moreover, after oxidation, the previously charged anolyte active material comprises a discharged anolyte active material and flows from the anode 112 back to the anolyte tank 130 along one or more of the electrolyte pathways 160.

Also during the electrochemical discharging operation of the hybrid flow redox battery system 100, the cathode 122 may receive a charged catholyte active material from the catholyte solution. Moreover, the cathode 122 may receive an electron from the power generation circuit 180 to reduce the charged catholyte active material. When reduced, the charged catholyte active material outputs a proton receivable by the proton pathway 108 formed by the ion-exchange membrane 120 (for example, the proton received by the anode 112). After reduction, the previously charged catholyte active material comprises a discharged catholyte active material and flows from the cathode 122 back to the catholyte tank 140 along one or more of the electrolyte pathways 160.

Referring still to FIGS. 1-5, during the electrochemical charging operation of the hybrid flow redox battery system 100, the anode 112 may receive the discharged anolyte active material from the anolyte solution. The anode 112 may also receive an electron from the power generation circuit 180 to reduce the discharged anolyte active material. When reduced, the discharged anolyte active material outputs a proton receivable by the proton pathway 108 formed by the ion-exchange membrane 120. Moreover, after reduction, the previously discharged anolyte active material comprises a charged anolyte active material and flows from the anode 112 back to the anolyte tank 130 along one or more of the electrolyte pathways 160.

Also during the electrochemical charging operation of the hybrid flow redox battery system 100, the cathode 122 may receive the discharged catholyte active material from the catholyte solution. Moreover, the cathode 122 may receive the proton output by the anode 112 from the proton pathway 108 formed by the ion-exchange membrane 120 to oxidize the discharged catholyte active material at the cathode 122. When oxidized, the discharged catholyte active material outputs an electron receivable by the cathode conductive portion 126 such that the electrons flow in an electron charging direction 107 along the circuit pathway 182 to the power generation circuit 180. After oxidation, the previously discharged catholyte active material comprises a charged catholyte active material and flows from the cathode 122 back to the catholyte tank 140 along one or more of the electrolyte pathways 160.

Referring still to FIGS. 1-5, the anolyte tank 130 includes an anolyte tank upper end 132 terminating at an anolyte tank upper surface 135, and an anolyte tank lower end 134 terminating at an anolyte tank lower surface 137. The anolyte tank 130 includes an anolyte tank inner surface 136 extending between the anolyte tank upper surface 135 and the anolyte tank lower surface 137. Further, the anolyte tank 130 includes an upper anolyte opening 131 and a lower anolyte opening 133, positioned below the upper anolyte opening 131. The upper anolyte opening 131 may be positioned at the anolyte tank upper end 132, for example, the upper anolyte opening 131 may extend through the anolyte tank upper surface 135. Further, the lower anolyte opening 133 may be positioned at the anolyte tank lower end 134, for example, the lower anolyte opening 133 may extend through the anolyte tank lower surface 137. However, it should be understood that the upper anolyte opening 131 and a lower anolyte opening 133 may each extend through the anolyte tank 130 at locations on the anolyte tank 130 at which the lower anolyte opening 133 is positioned below the upper anolyte opening 131, for example, at locations along the anolyte tank inner surface 136.

Further, the one or more electrolyte pathways 160 include a lower anolyte pathway 162 and an upper anolyte pathway 164. The lower anolyte pathway 162 extends between and fluidly couples the lower anolyte opening 133 of the anolyte tank 130 and the anode 112, for example, the anolyte receiving portion 114 of the anode 112. The upper anolyte pathway 164 extends between and fluidly couples the upper anolyte opening 131 of the anolyte tank 130 and the anode 112, for example, the anolyte receiving portion 114 of the anode 112. The lower anolyte pathway 162 and upper anolyte pathway 164 each comprise a tube, pipe or other fluid pathway mechanism. Further, an anolyte pump 139 may be fluidly coupled to one of the lower anolyte pathway 162 or the upper anolyte pathway 164. The anolyte pump 139 comprises any fluid pumping mechanism and is structurally configured to generate fluid flow between the anolyte tank 130 and the anode 112.

Referring now to FIGS. 2-5, the lower anolyte opening 133 may be a first lower anolyte opening 133a and the anolyte tank 130 may further include a second lower anolyte opening 133b. Similar to the first lower anolyte opening 133a, the second lower anolyte opening 133b is also positioned below the upper anolyte opening 131 and is fluidly coupled to the lower anolyte pathway 162. For example, the second lower anolyte opening 133b may extend through the anolyte tank lower surface 137 or may extend though the anolyte tank inner surface 136.

As depicted in FIG. 2-5, the lower anolyte pathway 162 may include a primary branch 162a coupled to the first lower anolyte opening 133a and a secondary branch 162b coupled to the second lower anolyte opening 133b. The primary branch 162a of the lower anolyte pathway 162 extends between the first lower anolyte opening 133a and the anode 112. Further, the secondary branch 162b of the lower anolyte pathway 162 extends between the second lower anolyte opening 133b and the primary branch 162a of the lower anolyte pathway 162. For example, as depicted in FIGS. 2-5, the secondary branch 162b is coupled to the primary branch 162a at an anolyte pathway convergence location 165. Thus, anolyte solution flow between the first lower anolyte opening 133a and the anode 112 traverses the primary branch 162a of the lower anolyte pathway 162. Further, anolyte solution flow between the second lower anolyte opening 133b and the anode 112 traverses both the secondary branch 162b and the portion of the primary branch 162a that extends between the anolyte pathway convergence location 165 and the anode 112.

Referring again to FIGS. 1-5, the catholyte tank 140 includes a catholyte tank upper end 142 terminating at a catholyte tank upper surface 145, and a catholyte tank lower end 144 terminating at a catholyte tank lower surface 147. The catholyte tank 140 include a catholyte tank inner surface 146 extending between the catholyte tank upper surface 145 and the catholyte tank lower surface 147 Further, the catholyte tank 140 includes an upper catholyte opening 141 and a lower catholyte opening 143, positioned below the upper catholyte opening 141. The upper catholyte opening 141 may be positioned at the catholyte tank upper end 142, for example, the upper catholyte opening 141 may extend through the catholyte tank upper surface 145. Further, the lower catholyte opening 143 may be positioned at the catholyte tank lower end 144, for example, the lower catholyte opening 143 may extend through the catholyte tank lower surface 147. However, it should be understood that the upper catholyte opening 141 and a lower catholyte opening 143 may each extend into the catholyte tank 140 at any locations on the catholyte tank 140 at which the lower catholyte opening 143 is positioned below the upper catholyte opening 141, for example, at locations along the catholyte tank inner surface 146

Further, the one or more electrolyte pathways 160 include a lower catholyte pathway 172 and an upper catholyte pathway 174. The lower catholyte pathway 172 extends between and fluidly couples the lower catholyte opening 143 of the catholyte tank 140 and the cathode 122, for example, the catholyte receiving portion 124 of the cathode 122. Further, the upper catholyte pathway 174 extends between and fluidly couples the upper catholyte opening 141 of the catholyte tank 140 and the cathode 122, for example, the catholyte receiving portion 124. The lower catholyte pathway 172 and the upper catholyte pathway 174 each comprise a tube, pipe or other fluid pathway mechanism. A catholyte pump 149 fluidly coupled to one of the lower catholyte pathway 172 or the upper catholyte pathway 174. The catholyte pump 149 comprises any fluid pumping mechanism and is structurally configured to generate fluid flow between the catholyte tank 140 and the cathode 122.

Referring again to FIG. 2-5, the lower catholyte opening 143 may be a first lower catholyte opening 143a and the catholyte tank 140 may further include a second lower catholyte opening 143b. Similar to the first lower catholyte opening 143a, the second lower catholyte opening 143b is also positioned below the upper catholyte opening 141 and is fluidly coupled to the lower catholyte pathway 172. For example, the second lower catholyte opening 143b may extend through the catholyte tank lower surface 147 or may extend through the catholyte tank inner surface 146.

As depicted in FIGS. 2-5, the lower catholyte pathway 172 may include a primary branch 172a coupled to the first lower catholyte opening 143a and a secondary branch 172b coupled to the second lower catholyte opening 143b. The primary branch of 172b of the lower catholyte pathway 172 extends between the first lower catholyte opening 143a and the cathode 122, for example, the catholyte receiving portion 124 of the cathode 122. Further, the secondary branch 172b of the lower catholyte pathway 172. For example, as depicted in FIGS. 2-5, the secondary branch 172b is coupled to the primary branch 172a at a catholyte pathway convergence location 175. Thus, catholyte solution flow between the first lower catholyte opening 143a and the cathode 122 traverses the primary branch 172a of the lower catholyte pathway 172. Further, catholyte solution flow between the second lower catholyte opening 143b and the cathode 122 traverses both the secondary branch 172b and the portion of the primary branch 172a that extends between the catholyte pathway convergence location 175 and the cathode 122.

Referring again to FIGS. 1-5, the one or more tank separators 150 comprise an anolyte tank separator 150a positioned within the anolyte tank 130 and a catholyte tank separator 150b positioned within the catholyte tank 140. The anolyte tank separator 150a is in translatable contact with the anolyte tank inner surface 136 to fluidly separate an upper volume of the anolyte tank 130 from a lower volume of the anolyte tank 130. As used in this disclosure, "upper volume of the anolyte tank 130" refers to the portion of the anolyte tank 130 between the anolyte tank separator 150a and the anolyte tank upper surface 135. Further, as used in this disclosure, "lower volume of the anolyte tank 130" refers to the portion of the anolyte tank 130 between the anolyte tank separator 150a and the anolyte tank lower surface 137.

The anolyte tank separator 150a is positioned within the anolyte tank 130 such that the anolyte tank separator 150a separates the charged anolyte active material from the discharged anolyte active material. Thus, in operation, the anolyte tank 130 may supply the anolyte receiving portion 114 of the anode 112 with anolyte solution that primarily includes only charged anolyte active material or discharged anolyte active material. As one example, the anolyte active material may be positioned in the anolyte tank 130 such that charged anolyte active material is housed within the upper volume of the anolyte tank 130 and the discharged anolyte active material is housed within the lower volume of the anolyte tank 130. In this example, the anolyte pump 139 may generate anolyte solution flow in the first flow direction 102 such that discharged anolyte active material travels from the lower volume of the anolyte tank 130 to the anode 112, for undergoing reduction and electrochemical charging, and alternatively, the anolyte pump 139 may generate anolyte solution flow in the second flow direction 103 such that charged anolyte active material travels from the upper volume of the anolyte tank 130 to the anode 112, for undergoing oxidation and electrochemical discharging.

As another example, the anolyte active material may be positioned in the anolyte tank 130 such that the discharged anolyte active material is housed within the upper volume of the anolyte tank 130 and the charged anolyte active material is housed within the lower volume of the anolyte tank 130. In this example, the anolyte pump 139 may generate anolyte solution flow in the first flow direction 102 such that charged anolyte active material travels from the lower volume of the anolyte tank 130 to the anode 112, for undergoing oxidation and electrochemical discharging, and alternatively, the anolyte pump 139 may generate anolyte solution flow in the second flow direction 103 such that discharged anolyte active material travels from the upper volume of the anolyte tank 130 to the anode 112, for undergoing reduction and electrochemical charging.

The catholyte tank separator 150b is in translatable contact with the catholyte tank inner surface 146 to fluidly separate an upper volume of the catholyte tank 140 from a lower volume of the catholyte tank 140. As used in this disclosure, "upper volume of the catholyte tank 140" refers to the portion of the catholyte tank 140 between the catholyte tank separator 150b and the catholyte tank upper surface 145. Further, as used in this disclosure, "lower volume of the catholyte tank 140" refers to the portion of the catholyte tank 140 between the catholyte tank separator 150b and the catholyte tank lower surface 147.

Moreover, the catholyte tank separator 150b is positioned within the catholyte tank 140 such that the catholyte tank separator 150b separates the charged catholyte active material from the discharged catholyte active material. Thus, in operation, the catholyte tank 140 may supply the catholyte receiving portion 124 of the cathode 122 with catholyte solution that primarily includes only charged catholyte active material or discharged catholyte active material. As one example, the catholyte active material may be positioned in the catholyte tank 140 such that charged catholyte active material is housed within the upper volume of the catholyte tank 140, and the discharged catholyte active material is housed within the lower volume of the catholyte tank 140. In this example, the catholyte pump 149 may generate catholyte solution flow in the first flow direction 102 such that discharged catholyte active material travels from the lower volume of the catholyte tank 140 to the cathode 122, for undergoing oxidation and electrochemical charging, and alternatively, the catholyte pump 149 may generate catholyte solution flow in the second flow direction 103 such that charged catholyte active material travels from the upper volume of the catholyte tank 140 to the cathode 122, for undergoing reduction and electrochemical discharging.

As another example, the catholyte active material may be positioned in the catholyte tank 140 such that discharged catholyte active material is housed within the upper volume of the catholyte tank 140, and the charged catholyte active material is housed within the lower volume of the catholyte tank 140. In this example, the catholyte pump 149 may generate catholyte solution flow in the first flow direction 102 such that charged anolyte active material travels from the lower volume of the catholyte tank 140 to the cathode 122, for undergoing reduction and electrochemical discharging, and alternatively, the catholyte pump 149 may generate catholyte solution flow in the second flow direction 103 such that discharged catholyte active material travels from the upper volume of the catholyte tank 140 to the cathode 122, for undergoing oxidation and electrochemical charging.

The anolyte tank separator 150a and the catholyte tank separator 150b are each translatable between a raised position 154 and a lowered position 156, for example, slidable. As depicted in FIGS. 1-5, the distance between the anolyte tank separator 150a and the anolyte tank lower surface 137 and the distance between the catholyte tank separator 150b and the catholyte tank lower surface 147 are both greater at the raised position 154 than at the lowered position 156. The distance between the anolyte tank separator 150a and the anolyte tank lower surface 137 corresponds with a height $h_a$ of the lower volume of the anolyte solution. Further, the distance between the catholyte tank separator 150b and the catholyte tank lower surface 147 corresponds with a height $h_c$ of the lower volume of the catholyte solution. While not depicted, in the raised position 154, the anolyte tank separator 150a may contact the anolyte tank upper surface 135 and the catholyte tank separator 150b may contact the catholyte tank upper surface 145. Moreover, in the lowered position 156, the anolyte tank separator 150a may contact the anolyte tank lower surface 137 and the catholyte tank separator 150b may contact the catholyte tank lower surface 147. However, it should be understood that the raised position 154 may be any location above the lowered position 156 and the lowered position 156 may be any location below the raised position 154.

The anolyte tank separator 150a and the catholyte tank separator 150b are each impermeable to the anolyte solution and the catholyte solution housed within the anolyte tank 130 and the catholyte tank 140, respectively. A mechanical sealer 152 may be coupled to each of the one or more tank separators 150 to prevent fluid passage between the upper volume and the lower volume of the anolyte tank 130 and the catholyte tank 140, respectively. The mechanical sealer 152 may comprise an O-ring, a gasket, or any other known-or-yet to be developed sealing device. Further, the anolyte tank separator 150a and the catholyte tank separator 150b each have a density greater than a density of the anolyte solution and the catholyte solution housed within the anolyte tank 130 and the catholyte tank 140, respectively.

For example, the anolyte tank separator 150a and the catholyte tank separator 150b may each comprise a density of from about 0.01 ton/m³ to about 15 ton/m³, for example, about 0.5 ton/m³, 1 ton/m³, 2 ton/m³, 3 ton/m³, 4 ton/m³, 5 ton/m³, 7.5 ton/m³, 10 ton/m³, 12.5 ton/m³, or the like. Further, the one or more tank separators 150 each comprise a weight of from about 0.1 tons to about 400 tons, for example, 0.5 tons, 1 ton, 5 tons, 10 tons, 25 tons, 30 tons, 35 tons, 40 tons, 45 tons, 50 tons, 75 tons, 90 tons, 100 tons, 150 tons, 200 tons, 250 tons, 300 tons, 350 tons or the like. Moreover, the anolyte tank separator 150a and the catholyte tank separator 150b may comprise the same density or different densities and may comprise the same weight or a different weight. Example materials of the anolyte tank separator 150a and the catholyte tank separator 150b include metals, non-metals, metallic alloys, ceramics, or the like. Moreover, it should be understood that the anolyte tank separator 150a may comprise any material having a density that is greater than the density of the anolyte solution and the catholyte tank separator 150b may comprise any material having a density that is greater than the catholyte solution.

In operation, movement of the anolyte tank separator 150a in a downward direction 153 between the raised position 154 and the lowered position 156 corresponds with anolyte solution flow between the anolyte tank 130 and the anode 112 in the first flow direction 102, for example, from the lower anolyte opening 133 to the anode 112 and anolyte solution flow from the anode 112 to the upper anolyte opening 131. Movement of the anolyte tank separator 150a in an upward direction 151 between the lowered position 156 and the raised position 154 corresponds with anolyte solution flow between the anolyte tank 130 and the anode 112 in the second flow direction 103, for example, anolyte solution flow from the upper anolyte opening 131 to the anode 112 and anolyte solution flow from the anode 112 to the lower anolyte opening 133.

Movement of the catholyte tank separator 150b in the downward direction 153 between the raised position 154 and the lowered position 156 corresponds with catholyte solution flow between the catholyte tank 140 and the cathode 122 in the first flow direction 102, for example, from the lower catholyte opening 143 to the cathode 122 and catholyte solution flow from the cathode 122 to the upper catholyte opening 141. Movement of the catholyte tank separator 150b in the upward direction 151 between the lowered position 156 and the raised position 154 corresponds with anolyte solution flow between the anolyte tank 130 and the anode 112 in the second flow direction 103, for example, catholyte solution flow from the upper catholyte opening 141 to the cathode 122 and catholyte solution flow from the cathode 122 to the lower catholyte opening 143.

Further, movement of the anolyte tank separator 150a and the catholyte tank separator 150b in the downward direction 153 applies a downward force to the lower volume of the anolyte solution and the lower volume of the catholyte solution, respectively, to increase the volumetric fluid flow of the anolyte solution and the catholyte solution through the one or more electrolyte pathways 160, for example, through lower anolyte pathway 162 and the lower catholyte pathway 172. By increasing the volumetric flow rate through the electrolyte pathways 160, the anolyte solution and the catholyte solution may actuate the one or more turbines 190 fluidly coupled to the one or more electrolyte pathways 160 such that the one or more turbines 190 hydroelectrically generate power.

The one or more tank separators 150, in combination with the one or more turbines 190, increase the total energy that may be stored in the hybrid flow redox battery system 100. The one or more tank separators 150 store potential energy, for example, when the one or more tank separators 150 are positioned in the raised position 154. The potential energy stored in the one or more tank separators 150 may be harvested hydroelectrically by the one or more turbines 190. The potential energy stored within each tank separator 150 may be mathematically described as $E=(m_e+m_p)ghe$, where E is the potential energy stored in each tank separator 150, $m_e$ is the mass of the electrolyte stored within the anolyte tank 130 or the catholyte tank 140 (for example, the anolyte solution or the catholyte solution), $m_p$ is the mass of the tank separator 150, g is the acceleration of gravity, h is the height of the lower volume of the electrolyte (for example, the height $h_a$ of the lower volume of the anolyte solution or the height $h_c$ of the lower volume of the catholyte solution), and e is the potential energy storage efficiency of the hybrid flow redox battery system 100. Thus, increasing the mass of the anolyte solution, the mass of the catholyte solution, the mass of the anolyte tank separator 150a, the mass of the catholyte tank separator 150b, the height $h_a$ of the lower volume of the anolyte solution, and the height $h_c$ of the lower volume of the catholyte solution, may each increase the potential energy stored in the one or more tank separators 150 and hydroelectrically harvestable by the one or more turbines 190.

Figure 6:
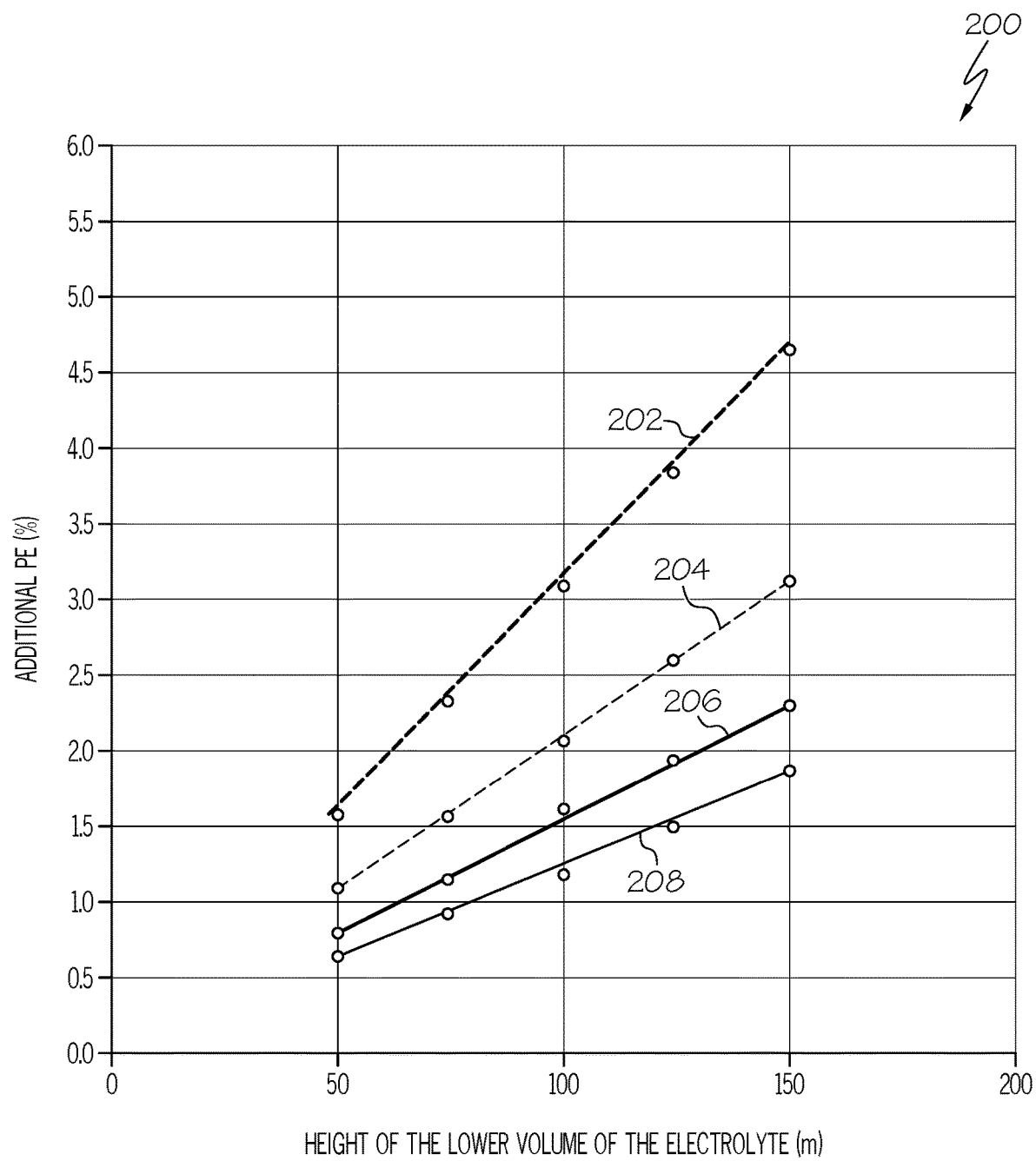
FIG. 6 is a graphical illustration of the additional potential energy added to the hybrid flow battery redox system by the one or more tanks separators based on positioning of the one or more tank separators, according to one or more embodiments shown and described herein.

Referring now to FIG. 6, a graph 200 is depicted showing the total potential energy collectively added to an example hybrid flow redox battery system 100 by the anolyte tank separator 150a and the catholyte tank separator 150b based on the height $h_a$ of the lower volume of the anolyte tank 130 and the height $h_c$ of the lower volume of the catholyte tank 140 (shown in FIG. 6 as "height of the lower volume of the electrolyte"), as well as the combined weight of the anolyte tank separator 150a and the catholyte tank separator 150b. In the example depicted in FIG. 6, the hybrid flow redox battery system 100 has a nominal power of 1 megawatt (MW) and a storage capacity of about 8 hours and thus, the total stored energy in this example hybrid flow redox battery system 100 is about 8000 kilowatt hours (kWh). Further, the potential energy storage efficiency e in this non-limiting example is about 80%. Moreover, the anolyte tank separator 150a and the catholyte tank separator 150b of the example hybrid flow redox battery system 100 graphically described in FIG. 6 each have a density of 2.5 ton/cubic meter (m³) and a tank separator height of 1 m.

Referring still to FIG. 6, the potential energy added to the example hybrid flow redox battery system 100 is graphically depicted for four example electrolytes each comprising a different energy density. For example, line 202 represents an electrolyte having an energy density of about 10 watt hour per liter (Wh/l), line 204 represents an electrolyte having an energy density of about 15 Wh/l, line 206 represents an electrolyte having an energy density of about 20 Wh/l, and line 208 represents an electrolyte having an energy density of about 25 Wh/l. As depicted in FIG. 6, the energy density of the electrolyte is inversely proportional to the additional stored energy in the hybrid flow redox battery system 100. Further, increasing the height $h_a$ of the lower volume of the anolyte solution and the height $h_c$ of the lower volume of the catholyte solution increases the additional stored energy in the hybrid flow redox battery system 100.

Moreover, the downward force applied to the lower volume of anolyte solution and the lower volume of the catholyte solution, respectively, by movement of the anolyte tank separator 150a and the catholyte tank separator 150b in the downward direction 153 drives anolyte solution flow and catholyte solution flow though the one or more electrolyte pathways 160. In operation, the force applied by the one or more tank separators 150 to the anolyte solution, the catholyte solution, or both, may reduce or eliminate the pumping power required by the anolyte pump 139 and the catholyte pump 149 to facilitate anolyte solution and catholyte solution flow in the first flow direction 102, which corresponds with movement of the one or more tank separators 150 in the downward direction 153. Thus, use of the anolyte pump 139 and the catholyte pump 149 may only be required for fluid flow in the second flow direction 103, corresponding with movement of the anolyte tank separator 150a and the catholyte tank separator 150b in the upward direction 151. Further, the energy hydroelectrically harvested by the one or more turbines 190 may offset some or all of the energy consumed by the anolyte pump 139 and the catholyte pump 149. For example, the hydroelectrically generated power may be greater than or equal to the power consumed by the anolyte pump 139 and the catholyte pump 149.

Figure 7:
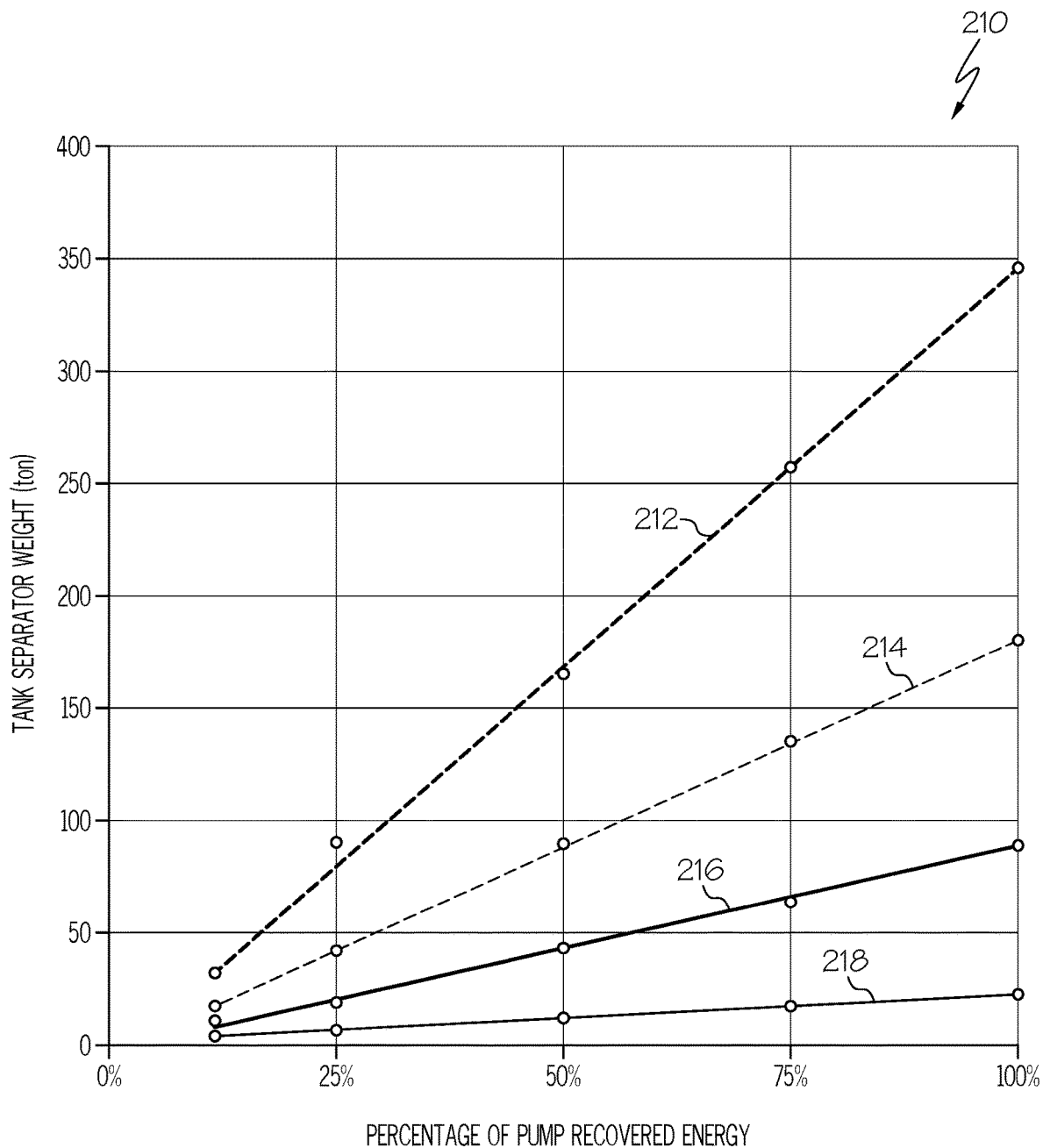
FIG. 7 is a graphical illustration of the percentage of the energy consumed by an anolyte pump and a catholyte pump that is recovered by the one or more turbines based on the total weight of the one or more tank separators of the flow redox battery system, according to one or more embodiments shown and described herein.

Referring now to FIG. 7, a graph 210 is depicted showing the percentage of energy consumed by anolyte pump 139 and the catholyte pump 149 that is generated (or recovered) by the anolyte side turbine 190a and the catholyte side turbine 190b based on the total weight of the anolyte tank separator 150a and the catholyte tank separator 150b. For example, the power generated hydroelectrically by electrolyte flow through the one or more turbines 190 when the one or more tank separators 150 translate in the downward direction 153 from the raised position 154 to the lowered position 156 may comprise greater than or equal to about 10%, 20%, 30%, 40%, 50%, 60%, 70%, 80%, 90%, 100%, or greater than 100% of the power consumed by the anolyte pump 139 and the catholyte pump 149 to translate the one or more tank separators 150 in the upward direction 151 from the lowered position 156 to the raised position 154.

The example hybrid flow redox battery system 100 graphically described in FIG. 7 includes an electrolyte having an electrolyte density of about 1.375 ton/m$^3$ and a tank height of about 50 m. The graph 210 of FIG. 7 depicts four example electrolytes each having a different electrolyte discharge volume. For example, line 212 represents an electrolyte discharge volume of 10 cubic meters per hour (m$^3$/h), line 214 represents an electrolyte discharge volume of 50 m$^3$/h, line 216 represents an electrolyte discharge volume of 100 m$^3$/h, and line 218 represents an electrolyte discharge volume of 200 m$^3$/h. As shown, increasing the weight of the one or more tank separators 150 and increasing the electrolyte discharge volume (see line 218) increases the percentage of pump recovered energy. FIG. 7 also depicts the total weight of the one or more tank separators 150 required to generate a strong enough fluid flow to replace the anolyte pump 139 and the catholyte pump 149 during fluid flow in the first flow direction 102.

Referring again to FIGS. 1-5, the one or more turbines 190 may be electrically coupled to one or more turbine generators 192. For example, each of the one or more turbines 190 may be electrically coupled to separate turbine generators 192. Alternatively, multiple turbines 190 may be electrically connected to the same turbine generator 192. Further, the one or more turbines 190 may be electrically coupled to the power generation circuit 180. Moreover, each of the one or more turbines 190 are fluidly coupled to the electrolyte pathways 160 and, in operation, electrolyte flow through each individual turbine 190 may actuate (for example, rotate) the individual turbine 190 to generate an electrical current that is receivable by an individual turbine generator 192, the power generation circuit 180 to hydroelectrically generate power, or both. The one or more turbines 190 may comprise any known or yet-to-be developed fluid actuated turbines, for example, horizontal hydro turbines, vertical hydro turbines, Francis turbines, Kaplan turbines, Tyson turbines, water wheels, Pelton wheels, Turgo turbines, cross-flow turbines, or the like.

As depicted in FIGS. 1-5 the one or more turbines 190 may include an anolyte side turbine 190a fluidly coupled to the lower anolyte pathway 162 or the upper anolyte pathway 164 and electrically coupled to an anolyte turbine generator 192a. For example, as depicted in FIGS. 2-5, the anolyte side turbine 190a may be fluidly coupled to the secondary branch 162b of the lower anolyte pathway 162 such that anolyte solution flow through the secondary branch 162b may traverse the anolyte side turbine 190a, actuating the anolyte side turbine 190a to generate a current that is receivable by the anolyte turbine generator 192a to hydroelectrically generate power.

Moreover, as depicted in FIGS. 1-5, the one or more turbines 190 include a catholyte side turbine 190b fluidly coupled to the lower catholyte pathway 172 or the upper catholyte pathway 174 and electrically coupled to a catholyte turbine generator 192b. For example, as depicted in FIGS. 2-5, the catholyte side turbine 190b may be fluidly coupled to the secondary branch 172b of the lower catholyte pathway 172 such that catholyte solution flow through the secondary branch 172b may traverse the catholyte side turbine 190b, actuating the catholyte side turbine 190b to generate a current that is receivable by the anolyte turbine generator 192a to hydroelectrically generate power.

Referring again to FIGS. 2-5, the hybrid flow redox battery system 100 may include a plurality of valves 185 fluidly coupled to the electrolyte pathways 160, for example, fluidly coupled to the lower anolyte pathway 162 and the lower catholyte pathway 172. Each of the plurality of valves 185 are actuatable between an open position 186 and a closed position 188. In operation, the open position 186 allows electrolyte flow through an individual valve 185 and the closed position 188 prevents electrolyte flow through an individual valve 185. For example, the plurality of valves 185 may be arranged and actuated such that, when electrolyte flows from the electrochemical cell 110 to at least one of the lower anolyte opening 133 and the lower catholyte opening 143, the plurality of valves 185 prevent electrolyte passage through at least one of the one or more turbines 190. Moreover, the plurality of valves 185 may be arranged and actuated such that, when electrolyte flows from at least one of the lower anolyte opening 133 and the lower catholyte opening 143 to the electrochemical cell 110, the plurality of valves 185 allow electrolyte passage through at least one of the one or more turbines 190. The plurality of valves 185 may comprise needle valves, gate valves, globe valves, ball valves, butterfly valves, diaphragm valves, piston valves, or any known or yet-to-be developed actuatable valves.

In operation, The plurality of valves 185 may include a first anolyte valve 185a, a second anolyte valve 185b, and a third anolyte valve 185c, each fluidly coupled to the lower anolyte pathway 162. The first anolyte valve 185a is fluidly coupled to the primary branch 162a of the lower anolyte pathway 162 between the first lower anolyte opening 133a and the anolyte pathway convergence location 165. The second anolyte valve 185b is fluidly coupled to the secondary branch 162b between the second lower anolyte opening 133b and the anolyte side turbine 190a. Further, the third anolyte valve 185c is fluidly coupled to the secondary branch 162b between the anolyte pathway convergence location 165 and the anolyte side turbine 190a.

Figure 2:
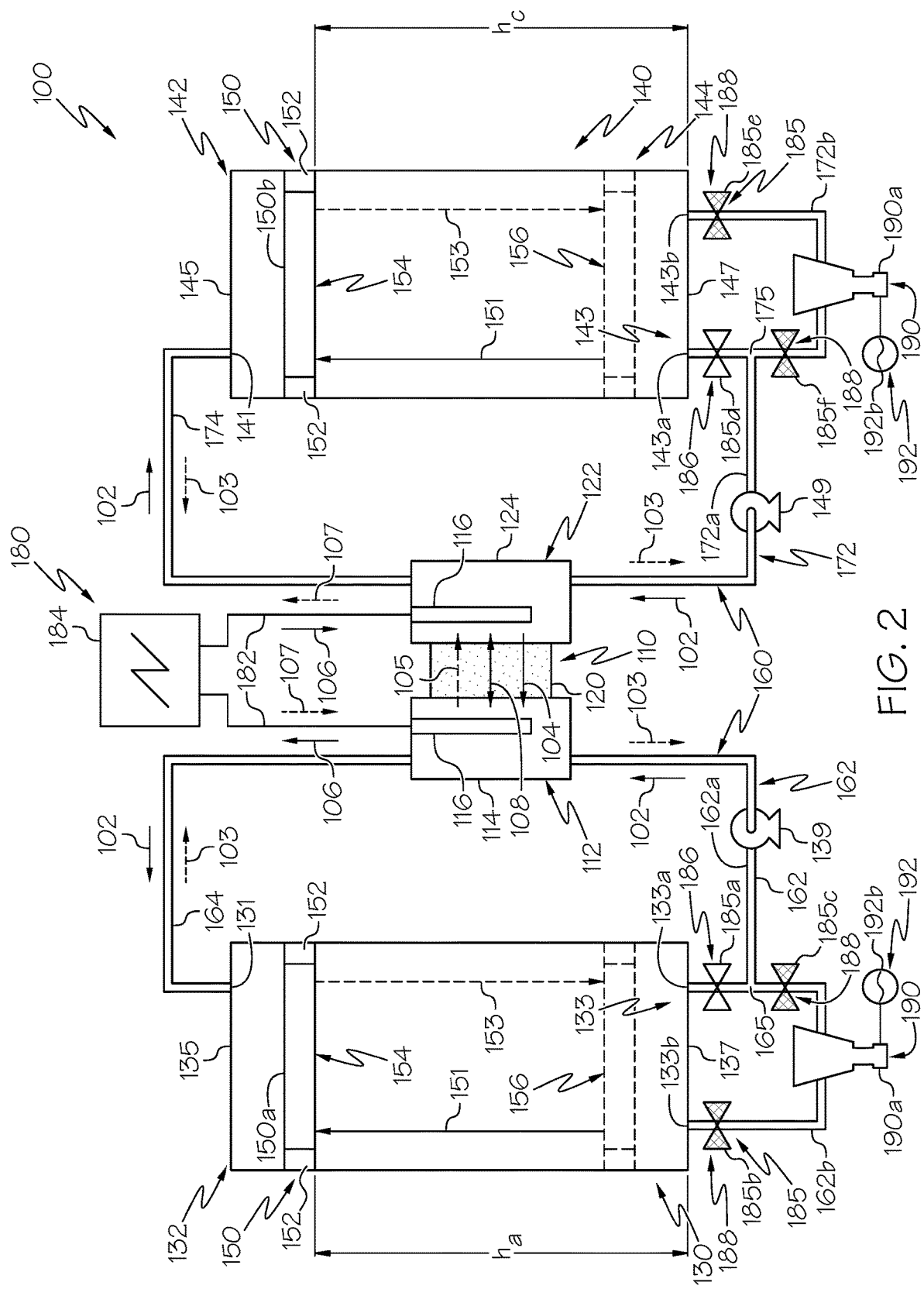
FIG. 2 is a schematic illustration of another embodiment of a hybrid flow redox battery system having one or more tank separators, one or more turbines, and a plurality of valves in an example actuation configuration, according to one or more embodiments shown and described herein.
Figure 4:
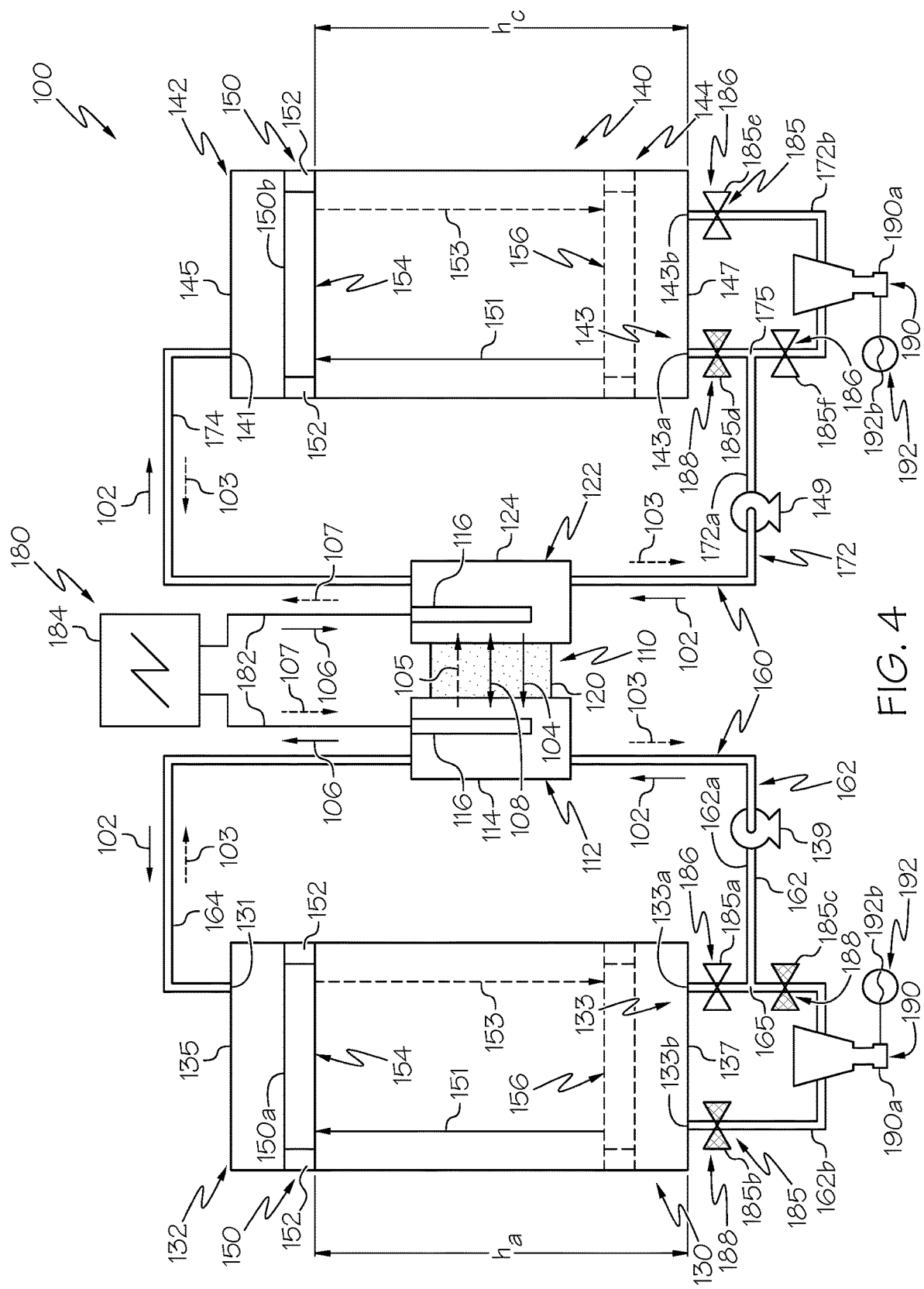
FIG. 4 is a schematic illustration of the hybrid flow redox battery system of FIG. 2 having the plurality of valves in another example actuation configuration, according to one or more embodiments shown and described herein.

In operation, when the first anolyte valve 185a is in the open position 186 and the second and third anolyte valves 185b, 185c are each in the closed position 188, as depicted in FIGS. 2 and 4, anolyte solution flow through the secondary branch 162b of the lower anolyte pathway 162 and thus through the anolyte side turbine 190a is impeded. For example, when the anolyte solution flows in the second flow direction 103, this actuation configuration may be desirable because the pumping power of the anolyte pump 139 is moving the anolyte tank separator 150a from the lowered position 156 and the raised position 154 and the anolyte tank separator 150a is not generating hydroelectrically harvestable fluid flow. Further, this actuation configuration may be desirable when the anolyte solution flows in the second flow direction 103, because anolyte solution flow in the second flow direction 103 may not actuate the anolyte side turbine 190a, for example, due to the shape and configuration of the anolyte side turbine 190a.

Figure 3:
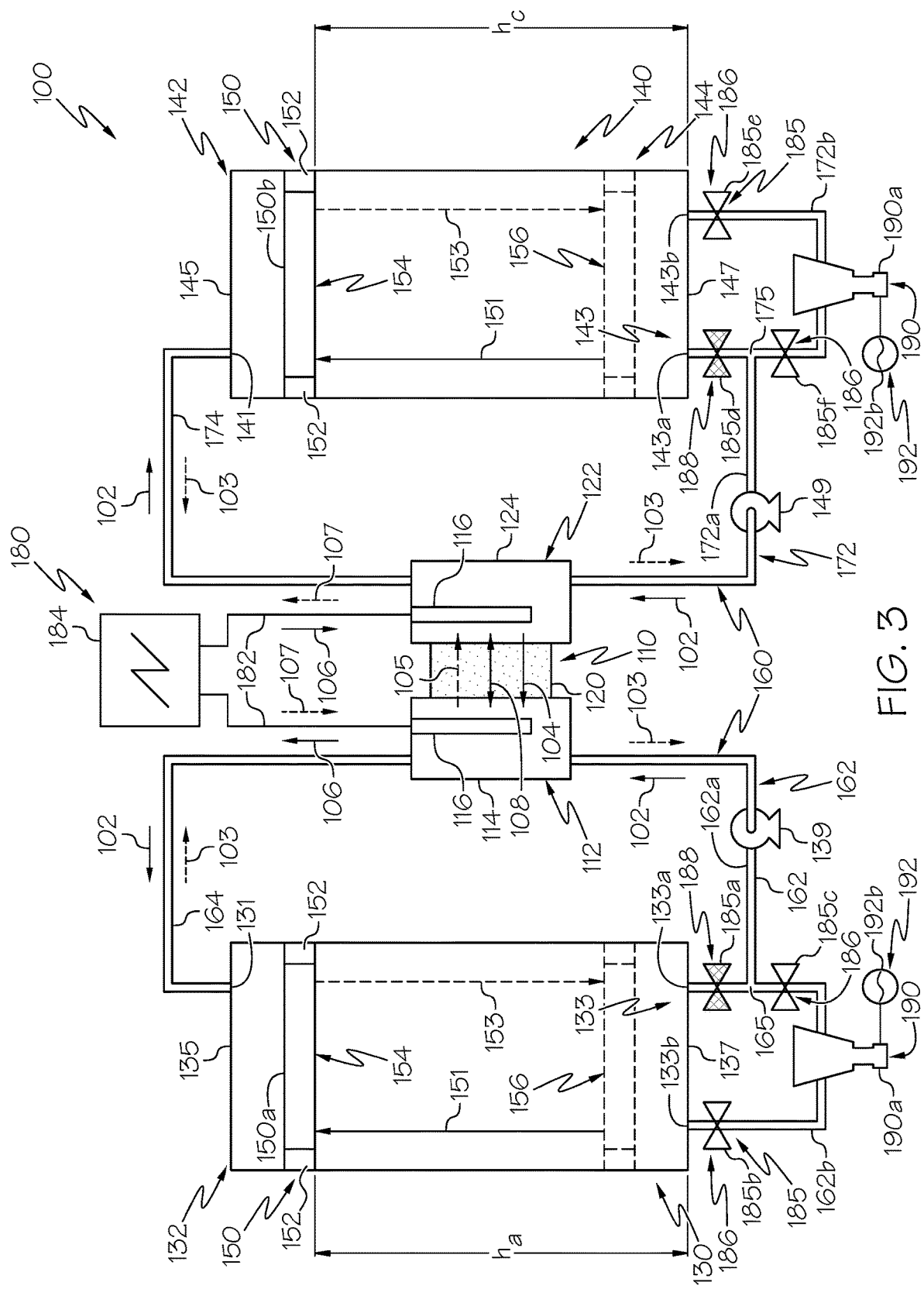
FIG. 3 is a schematic illustration of the hybrid flow redox battery system of FIG. 2 having the plurality of valves in another example actuation configuration, according to one or more embodiments shown and described herein.
Figure 5:
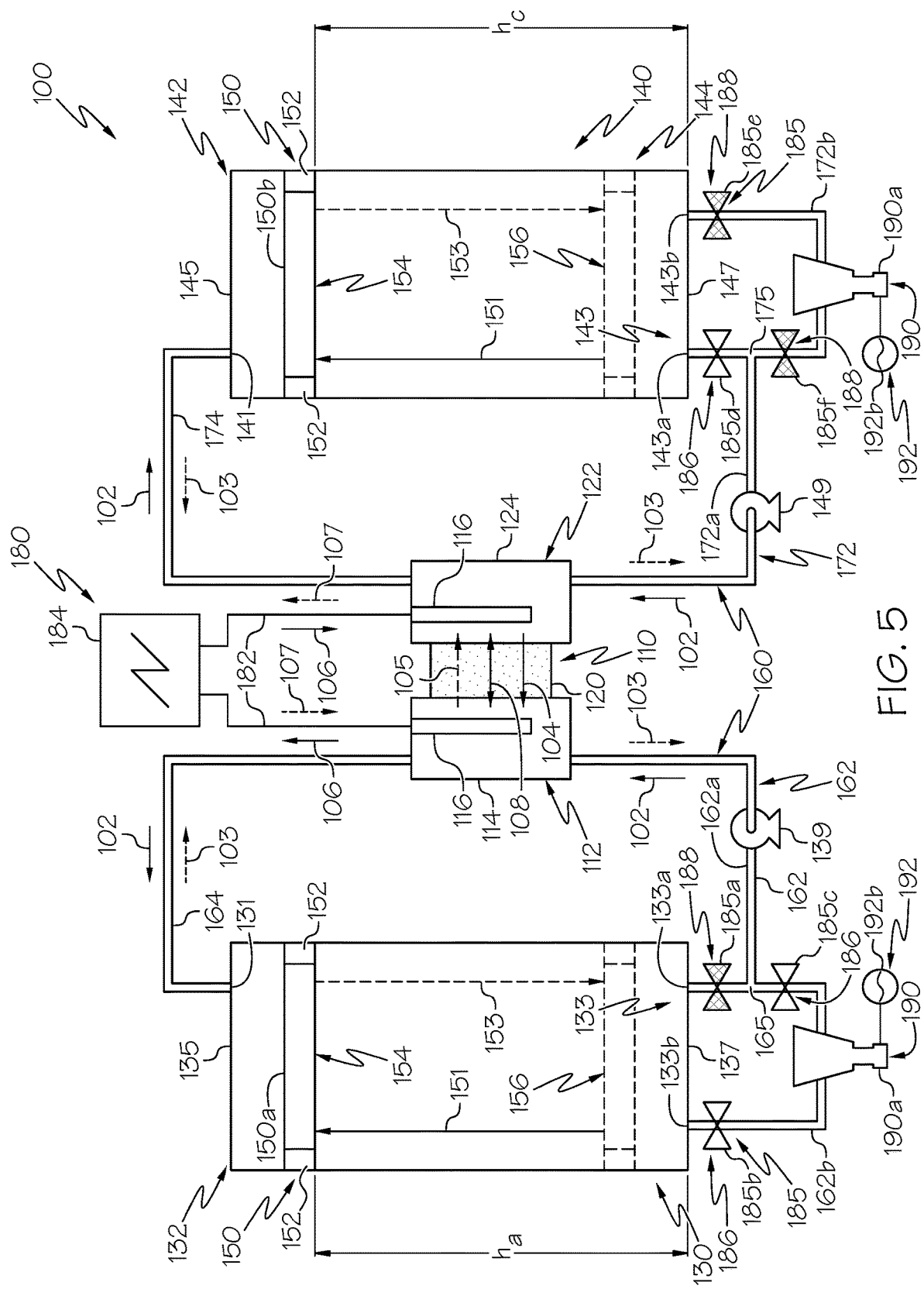
FIG. 5 is a schematic illustration of the hybrid flow redox battery system of FIG. 2 having the plurality of valves in another example actuation configuration, according to one or more embodiments shown and described herein.

When the first anolyte valve 185a is in the closed position 188 and the second and third anolyte valves 185b, 185c are each in the open position 186, as depicted in FIGS. 3 and 5, anolyte solution flow through the secondary branch 162b of the lower anolyte pathway 162 and thus through the anolyte side turbine 190a is not impeded. Moreover, when the first anolyte valve 185a is in the closed position 188 and the second and third anolyte valves 185b, 185c are each in the open position 186, anolyte solution flow between the first lower anolyte opening 133a and the anolyte pathway convergence location 165 is impeded. For example, when the anolyte solution flows in the first flow direction 102, this actuation configured may be desirable to facilitate fluid flow through the anolyte side turbine 190a to actuate the anolyte side turbine 190a and hydroelectrically generate power.

Referring still to FIGS. 2-5, the plurality of valves 185 may include a first catholyte valve 185d, a second catholyte valve 185e, and a third catholyte valve 185f. The first catholyte valve 185d is fluidly coupled to the primary branch 172a of the lower catholyte pathway 172 between the first lower catholyte opening 143a and the catholyte pathway convergence location 175. The second catholyte valve 185e is fluidly coupled to the secondary branch 162b of the lower catholyte pathway 172 between the second lower catholyte opening 143b and the catholyte side turbine 190b. Further, the third catholyte valve 185f is fluidly coupled to the secondary branch 162b of the lower catholyte pathway 172 between the catholyte pathway convergence location 175 and the catholyte side turbine 190b.

In operation, when the first catholyte valve 185d is in the open position 186 and the second and third catholyte valves 185e, 185f are each in the closed position 188, as depicted in FIGS. 2 and 5, catholyte solution flow through the secondary branch 172b of the lower catholyte pathway 172 and thus through the catholyte side turbine 190b is impeded. For example, when the catholyte solution flows in the second flow direction 103, this actuation configuration may be desirable because the pumping power of the catholyte pump 149 is moving the catholyte tank separator 150b from the lowered position 156 and the raised position 154 and the catholyte tank separator 150b is not generating hydroelectrically harvestable fluid flow. Further, this actuation con-figuration may be desirable when the catholyte solution flows in the second flow direction 103, because catholyte solution flow in the second flow direction 103 may not actuate the catholyte side turbine 190b, for example, due to the shape and configuration of the catholyte side turbine 190b.

When the first catholyte valve 185d is in the closed position 188 and the second and third catholyte valves 185e, 185f are each in the open position 186, as depicted in FIGS. 3 and 4, catholyte solution flow through the catholyte side turbine 190b is not impeded. Moreover, when the first catholyte valve 185d is in the closed position 188 and the second and third catholyte valves 185e, 185f are each in the open position 186, electrolyte flow between the first lower catholyte opening 143a and the catholyte pathway convergence location 175 is impeded. For example, when the catholyte solution flows in the first flow direction 102, this actuation configured may be desirable to facilitate fluid flow through the catholyte side turbine 190b to actuate the catholyte side turbine 190b and hydroelectrically generate power. Further, as depicted in FIGS. 4 and 5, the anolyte valves 185a-c and the catholyte valves 185d-f may be in different actuation configurations, for example, when the hybrid flow redox battery system 100 is arranged such that electrochemical charging and electrochemical discharging occur when the anolyte solution and the catholyte solution flow in opposite directions.

Moreover, the one or more tank separators 150 facilitate an increased concentration of reactant anolyte active materials within the anode 112 and reactant catholyte active materials within the cathode 122 during operation of the electrochemical cell 110, which decreases the electrochemical loss of the hybrid flow redox battery system 100. For example, when electrochemically discharging the hybrid flow redox battery system 100, charged anolyte active materials are reactant anolyte active materials and charged catholyte active materials are reactant catholyte active materials and when electrochemically charging the hybrid flow redox battery system 100, discharged anolyte active materials are the reactant anolyte active materials and discharged catholyte active materials are the reactant catholyte active materials. Accordingly, separating the charged and discharged anolyte active materials within the anolyte tank 130 using the anolyte tank separator 150a and separating the charged and discharged catholyte active materials within catholyte tank 140 using the catholyte tank separator 150b and selectively pumping reactant anolyte active materials into the anode 112 and reactant catholyte active materials into the cathode 122 may increase the efficiency of the hybrid flow redox battery system 100 by reducing electrochemical losses of the hybrid flow redox battery system 100.

For example, the hybrid flow redox battery system 100 comprises an open-circuit voltage $V_{OC}$ or electromotive force (EMF), which is the maximum voltage that may be generated by the electrochemical discharge of the hybrid flow redox battery system 100 under open-circuit conditions, for example, when there is zero current in the power generation circuit 180. The open-circuit voltage $V_{OC}$ is affected by the reduction and oxidation reactions at the electrochemical cell 110, the concentration of the reactant anolyte active materials in the anode 112 and reactant catholyte active materials in the cathode 122 (the Nernst voltage) and the operation temperature.

The open-circuit voltage $V_{OC}$ of the hybrid flow redox battery system 100 may be mathematically described as $$V_{OC} = V_{OC}^{\circ} + \frac{RT}{nF} \ln \frac{a_{ox}}{a_{red}}$$

where $V°_{OC}$ is the reversible, maximum voltage between the anode 112 and the cathode 122, R is the universal gas constant, T is the operation temperature of the electrochemical cell 110, n is the number of moles of electrons transferred in the electrochemical cell 110 redox half-reactions, for example, the number of moles of electrons transferred between the anolyte solution and the catholyte solution along the circuit pathway 182, F is the Faraday constant, which is 96485 coulomb/mol, $\alpha_{ox}$ is the activity of the oxidant species (for example, the anolyte solution during a discharging operation or the catholyte solution during the charging operation) and $\alpha_{red}$ is the activity of the reductant species (for example, the anolyte solution during the electrochemical charging operation or the catholyte solution during the electrochemical discharging operation).

The activity ratio $$\frac{a_{ox}}{a_{red}}$$

changes when electrochemical discharging or electrochemical charging of the hybrid flow redox battery system 100. For example, the activity ratio is maximized at full charge. Further, the activity ratio decreases at a lesser charge, because the concentration of the reactant active materials decreases and the concentration of the non-reactant active materials increases, which may decrease the open-circuit voltage $V_{OC}$. Accordingly, separating the charged and discharged anolyte and catholyte active materials in each of the anolyte and catholyte solutions using the anolyte tank separator 150a and the catholyte tank separator 150b, respectively, may maximize the concentration of reactant active materials within the electrochemical cell 110 and increase the open-circuit voltage $V_{OC}$ of the hybrid flow redox battery system 100.

Separating the charged and discharged anolyte active materials and charged and discharged catholyte active materials within the anolyte tank 130 and the catholyte tank 140, using the anolyte tank separator 150a and the catholyte tank separator 150b, respectively, may minimize the recirculation of the reactant active materials back to the anolyte tank 130 and the catholyte tank 140, respectively and minimize the amount of non-reactant active materials introduced into the electrochemical cell 110. This increases the open circuit voltage of the hybrid flow redox battery system 100 because the concentrations of the products reactant active materials may be constant during operation, as mathematically described by $[A^{\beta+}]=\alpha[A^{\alpha+}]°$ and $[B^{\gamma+}]=\alpha[B^{\delta+}]°$, where $\alpha$ is the percentage of the reactant active materials re-circulated back to the anolyte tank 130 and catholyte tank 140, respectively, and $[A^{\alpha+}]°$ and $[B^{\delta+}]°$ are the initial (full charge) concentration of the reactant active materials, respectively. Thus, the state of charge SOC may be mathematically described as $$SOC = \frac{[A^{\alpha+}]}{[A^{\alpha+}]°} = \frac{[B^{\delta+}]}{[B^{\delta+}]°}$$

and the open circuit voltage may be mathematically described as $$V_{OC} = V_{OC}^{O} + \frac{RT}{nF} \ln \frac{SOC^2([H^+]_{cathode}^O)^3}{a^2[H^+]_{anode}^O}.$$

Accordingly, the anolyte tank separator 150a and the catholyte tank separator 150b increase the overall energy storage and harvesting capabilities of the hybrid flow redox battery system 100 by both separating the charged and discharged anolyte active materials and charged and discharged catholyte active materials within the anolyte tank 130 and the catholyte tank 140, respectively, and facilitating flow of the anolyte solution, the catholyte solution, or both, through the anolyte side turbine 190a and the catholyte side turbine 190b to hydroelectrically generate additional power.

It is noted that recitations in this disclosure of a component of the present disclosure being "configured" in a particular way, to embody a particular property, or to function in a particular manner, are structural recitations, as opposed to recitations of intended use. More specifically, the references in this disclosure to the manner in which a component is "configured" denotes an existing physical condition of the component and, as such, is to be taken as a definite recitation of the structural characteristics of the component.

For the purposes of describing and defining the present invention it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified in this disclosure as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A hybrid flow redox battery system comprising an electrochemical cell, an anolyte tank, a catholyte tank, one or more tank separators, a plurality of electrolyte pathways, one or more turbines, and one or more power generation circuits, wherein:

the electrochemical cell comprises an ion-exchange membrane positioned between and electrochemically engaged with an anode and a cathode;

at least one of the one or more power generation circuits is electrically coupled to the anode and the cathode;

the anolyte tank includes an upper anolyte opening and a lower anolyte opening positioned below the upper anolyte opening;

the catholyte tank includes an upper catholyte opening and a lower catholyte opening positioned below the upper catholyte opening;

one or more of the plurality of electrolyte pathways extend between the upper anolyte opening and the anode and extend between the lower anolyte opening and the anode to fluidly couple the anolyte tank to the anode;

one or more of the plurality of electrolyte pathways extend between the upper catholyte opening and the cathode and extend between the lower catholyte opening and the cathode to fluidly couple the catholyte tank to the cathode;

the one or more turbines are fluidly coupled to one or more of the plurality of electrolyte pathways;

the one or more tank separators are positioned within one or both of the anolyte tank and the catholyte tank; and the one or more tank separators are translatable in a downward direction to induce electrolyte flow from one or both of the lower anolyte opening and the lower catholyte opening through the one or more turbines to hydroelectrically generate power.

2. The hybrid flow redox battery system of claim 1, wherein:

the one or more tank separators comprise an anolyte tank separator positioned within the anolyte tank and a catholyte tank separator positioned within the catholyte tank;

the anolyte tank separator is positioned within the anolyte tank such that the anolyte tank separator separates a charged anolyte active material from a discharged anolyte active material; and the catholyte tank separator is positioned within the catholyte tank such that the catholyte tank separator separates a charged catholyte active material from a discharged catholyte active material.

3. The hybrid flow redox battery system of claim 1, wherein the one or more tank separators each comprise a density of from 1 ton/m$^3$ to 5 tons/m$^3$ and a weight of from 1 ton to 400 tons.

4. The hybrid flow redox battery system of claim 1, further comprising one or more valves fluidly coupled to one or more of the plurality of electrolyte pathways, wherein:

each of the one or more valves are actuatable between an open position and a closed position;

the open position allows electrolyte passage through the one or more valves; and the closed position prevents electrolyte passage through the one or more valves.

5. The hybrid flow redox battery system of claim 1, wherein:

the one or more turbines are electrically coupled to one or more turbine generators; and electrolyte flow from one or both of the lower anolyte opening and the lower catholyte opening through the one or more turbines rotates the one or more turbines to generate an electrical current that is receivable by the one or more turbine generators to hydroelectrically generate power.

6. The hybrid flow redox battery system of claim 1, wherein the plurality of electrolyte pathways comprise:

a lower anolyte pathway extending between and fluidly coupling the lower anolyte opening and the anode;

an upper anolyte pathway extending between and fluidly coupling the upper anolyte opening and the anode;

a lower catholyte pathway extending between and fluidly coupling the lower catholyte opening and the cathode; and an upper catholyte pathway extending between and fluidly coupled the upper catholyte opening and the cathode.

7. The hybrid flow redox battery system of claim 6, wherein:

the lower anolyte opening comprises a first lower anolyte opening;

the anolyte tank further comprises a second lower anolyte opening positioned below the upper anolyte opening and fluidly coupled to the lower anolyte pathway;

the lower anolyte pathway comprises a primary branch extending between the first lower anolyte opening and the anode;

the lower anolyte pathway comprises a secondary branch extending between the second lower anolyte opening and the primary branch of the lower anolyte pathway; and the one or more turbines comprise an anolyte side turbine fluidly coupled to the secondary branch of the lower anolyte pathway.

8. The hybrid flow redox battery system of claim 7, further comprising:

a first anolyte valve fluidly coupled to the primary branch of the lower anolyte pathway between the first lower anolyte opening and an anolyte pathway convergence location of the primary branch and the secondary branch of the lower anolyte pathway;

a second anolyte valve fluidly coupled to the secondary branch between the second lower anolyte opening and the anolyte side turbine; and a third anolyte valve fluidly coupled to the secondary branch between the anolyte pathway convergence location and the anolyte side turbine.

9. The hybrid flow redox battery system of claim 8, wherein:

each of the first, second, and third anolyte valves are actuatable between a closed position and an open position;

when the first anolyte valve is in the open position and the second and third anolyte valves are each in the closed position, electrolyte flow through the anolyte side turbine is impeded and;

when the first anolyte valve is in the closed position and the second and third anolyte valves are each in the open position, electrolyte flow through the anolyte side turbine is not impeded.

10. The hybrid flow redox battery system of claim 6, wherein:

the lower catholyte opening comprises a first lower catholyte opening;

the catholyte tank further comprises a second lower catholyte opening positioned below the upper catholyte opening and fluidly coupled to the lower catholyte pathway;

the lower catholyte pathway comprises a primary branch extending between the first lower catholyte opening and the cathode;

the lower catholyte pathway comprises a secondary branch extending between the second lower catholyte opening and the primary branch; and the one or more turbines comprise a catholyte side turbine fluidly coupled to the secondary branch of the lower catholyte pathway.

11. The hybrid flow redox battery system of claim 10, further comprising:

a first catholyte valve fluidly coupled to the primary branch of the lower catholyte pathway between the first lower catholyte opening and a catholyte pathway convergence location of the primary branch and the secondary branch of the lower catholyte pathway;

a second catholyte valve fluidly coupled to the secondary branch between the second lower catholyte opening and the catholyte side turbine; and a third catholyte valve fluidly coupled to the secondary branch between the catholyte pathway convergence location and the catholyte side turbine.

12. The hybrid flow redox battery system of claim 11, wherein:

each of the first, second, and third catholyte valves are actuatable between a closed position and an open position;

when the first catholyte valve is in the open position and the second and third catholyte valves are each in the closed position, electrolyte flow through the catholyte side turbine is impeded and;

when the first catholyte valve is in the closed position and the second and third catholyte valves are each in the open position, electrolyte flow through the catholyte side turbine is not impeded.

13. The hybrid flow redox battery system of claim 1, further comprising an anolyte solution wherein one or more active materials of the anolyte solution comprises vanadium, chromium, zinc, sulfur, neptunium, uranium, or a combination thereof.

14. The hybrid flow redox battery system of claim 13, wherein the anode is electrochemically configured to:

oxidize a charged anolyte active material of the anolyte solution such that the charged anolyte active material outputs an electron receivable by at least one of the one or more power generation circuits upon receiving both the charged anolyte active material and a proton from the ion-exchange membrane; and reduce a discharged anolyte active material of the anolyte solution such that the discharged anolyte active material outputs a proton receivable by the ion-exchange membrane upon receiving both the discharged anolyte active material and an electron from at least one of the one or more power generation circuits.

15. The hybrid flow redox battery system of claim 1, further comprising a catholyte solution wherein one or more active materials of the catholyte solution comprises vanadium, bromine, cerium, chlorine, ferricyanide, ferrocyanide, manganese, neptunium oxide, uranium oxide, or a combination thereof.

16. The hybrid flow redox battery system of claim 15, wherein the cathode is electrochemically configured to:

reduce a charged catholyte active material such that the charged catholyte active material outputs a proton receivable by the ion-exchange membrane upon receiving both the charged catholyte active material and an electron from at least one of the one or more power generation circuits; and oxidize a discharged catholyte active material such that the discharged catholyte active material outputs an electron receivable by at least one of the one or more power generation circuits upon receiving both the discharged catholyte active material a proton from the ion-exchange membrane.

17. The hybrid flow redox battery system of claim 1, wherein the ion-exchange membrane comprises a solid state proton conducting material structurally configured to provide a proton pathway between the anode and the cathode.

18. The hybrid flow redox battery system of claim 1, further comprising one or more pumps fluidly coupled to one or more of the plurality of electrolyte pathways, wherein:

the one or more pumps are structurally configured to induce electrolyte flow from one or more one or both of the upper anolyte opening and the upper catholyte opening and translate the one or more tank separators in an upward direction; and the power generated hydroelectrically by electrolyte flow through the one or more turbines when the one or more tank separators translate from a raised position to a lowered position in the downward direction is greater than or equal to the power consumed by the one or more pumps to translate the one or more tank separators in the upward direction from the lowered position to the raised position.

19. A hybrid flow redox battery system comprising an electrochemical cell, an anolyte tank, a catholyte tank, one or more tank separators, a plurality of electrolyte pathways, one or more turbines, one or more pumps, and one or more power generation circuits, wherein:

the electrochemical cell comprises an ion-exchange membrane positioned between and electrochemically engaged with an anode and a cathode;

at least one of the one or more power generation circuits is electrically coupled to the anode and the cathode;

the anolyte tank includes an upper anolyte opening and a lower anolyte opening positioned below the upper anolyte opening;

the catholyte tank includes an upper catholyte opening and a lower catholyte opening positioned below the upper catholyte opening;

one or more of the plurality of electrolyte pathways extend between the upper anolyte opening and the anode and extend between the lower anolyte opening and the anode to fluidly couple the anolyte tank to the anode;

one or more of the plurality of electrolyte pathways extend between the upper catholyte opening and the cathode and extend between the lower catholyte opening and the cathode to fluidly couple the catholyte tank to the cathode;

the one or more pumps are fluidly coupled to one or more of the plurality of electrolyte pathways;

the one or more turbines are fluidly coupled to one or more of the plurality of electrolyte pathways;

the one or more tank separators are positioned within one or both of the anolyte tank and the catholyte tank;

the one or more tank separators are translatable in a downward direction to induce electrolyte flow from one or both of the lower anolyte opening and the lower catholyte opening through the one or more turbines, rotating the one or more turbines to hydroelectrically generate power; and the power generated hydroelectrically by electrolyte flow through the one or more turbines when the one or more tank separators translate from a raised position to a lowered position in the downward direction is greater than or equal to 50% of the power consumed by the one or more pumps to translate the one or more tank separators in an upward direction from the lowered position to the raised position.

20. A hybrid flow redox battery system comprising an electrochemical cell, an anolyte tank, a catholyte tank, one or more tank separators, a plurality of electrolyte pathways, one or more turbines, one or more valves, and one or more power generation circuits, wherein:

the electrochemical cell comprises an ion-exchange membrane positioned between and electrochemically engaged with an anode and a cathode;

at least one of the one or more power generation circuits is electrically coupled to the anode and the cathode;

the anolyte tank includes an upper anolyte opening and a lower anolyte opening positioned below the upper anolyte opening;

the catholyte tank includes an upper catholyte opening and a lower catholyte opening positioned below the upper catholyte opening;

one or more of the plurality of electrolyte pathways extend between the upper anolyte opening and the anode and extend between the lower anolyte opening and the anode to fluidly couple the anolyte tank to the anode;

one or more of the plurality of electrolyte pathways extend between the upper catholyte opening and the cathode and extend between the lower catholyte opening and the cathode to fluidly couple the catholyte tank to the cathode;

the one or more valves are fluidly coupled to one or more of the plurality of electrolyte pathways;

the one or more turbines are fluidly coupled to one or more of the plurality of electrolyte pathways;

the one or more tank separators are positioned within one or both of the anolyte tank and the catholyte tank;

the one or more tank separators are translatable in a downward direction to induce electrolyte flow from one or both of the lower anolyte opening and the lower catholyte opening through the one or more turbines to hydroelectrically generate power;

when electrolyte flows from the electrochemical cell to at least one of the lower anolyte opening and the lower catholyte opening the one or more valves prevent electrolyte passage through at least one of the one or more turbines; and when electrolyte flows from at least one of the lower anolyte opening and the lower catholyte opening to the electrochemical cell, the one or more valves allow electrolyte passage through at least one of the one or more turbines.

* * * * *